United States Patent
Koziol

(10) Patent No.: US 6,513,764 B2
(45) Date of Patent: Feb. 4, 2003

(54) CABLE HOLDER FOR ATTACHING CABLES TO A VEHICLE STRUCTURE

(75) Inventor: Siegmund Koziol, Hohenlinden (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/800,136

(22) Filed: Mar. 5, 2001

(65) Prior Publication Data

US 2001/0019094 A1 Sep. 6, 2001

(30) Foreign Application Priority Data

Mar. 6, 2000 (DE) .......................................... 100 10 934

(51) Int. Cl.[7] ................................................ F16L 3/00
(52) U.S. Cl. .......................... 248/68.1; 248/49; 248/65; 248/544
(58) Field of Search ........................... 248/68.1, 49, 65, 248/503, 247, 248, 544, 909, 548

(56) References Cited

U.S. PATENT DOCUMENTS

| | | | |
|---|---|---|---|
| 1,523,164 A | * 1/1925 | Barnard et al. | 248/200 |
| 2,387,951 A | * 10/1945 | Slater et al. | 248/68.1 |
| 2,560,845 A | * 7/1951 | Carpenter et al. | 248/101 |
| 4,323,378 A | * 4/1982 | Miljoen | 24/30.5 R |
| 4,579,310 A | * 4/1986 | Wells et al. | 248/544 |
| 4,795,121 A | * 1/1989 | Comito | 211/26 |
| 4,957,251 A | * 9/1990 | Hubbard | 248/126 |
| 5,349,040 A | * 9/1994 | Trinks et al. | 521/155 |
| 5,405,111 A | * 4/1995 | Medlin | 248/205.1 |
| 5,441,230 A | * 8/1995 | Sambleson | 248/495 |
| 5,588,631 A | * 12/1996 | Yee | 211/14 |
| 5,731,373 A | * 3/1998 | Hirose et al. | 524/425 |
| 5,743,497 A | * 4/1998 | Michael | 248/316.7 |
| 5,752,682 A | * 5/1998 | Anderson | 248/316.7 |
| 5,794,903 A | * 8/1998 | Peterson, II | 248/300 |
| 6,216,320 B1 | * 4/2001 | Schauermann | 24/293 |

FOREIGN PATENT DOCUMENTS

| | | |
|---|---|---|
| DE | 675892 | 5/1939 |
| DE | 1896156 | 7/1964 |
| DE | 9317299 | 3/1994 |
| EP | 0718946 | 6/1996 |

* cited by examiner

Primary Examiner—Korie Chan
Assistant Examiner—Ingrid Weinhold
(74) Attorney, Agent, or Firm—Ladas & Parry

(57) ABSTRACT

A cable holder for attaching cables to a support structure is in the form of a one-piece plate having first and second functional portions disposed side by side and extending in the longitudinal direction of the holder. The first portion is provided with a plurality of transverse slots disposed in parallel spaced relation along the length of the holder. The plate is made of plastic material and is provided with indicator markings spaced uniformly along one or both longitudinal edges of the plate so that the plate can be severed at the indicator markings to obtain plate segments of determined size. The first and second portions can lie in a common plane or be offset by a step or be at right angles to one another.

7 Claims, 2 Drawing Sheets

US 6,513,764 B2

CABLE HOLDER FOR ATTACHING CABLES TO A VEHICLE STRUCTURE

FIELD OF THE INVENTION

The invention relates to cable holders for attaching cables to a vehicle structure, particularly to an aircraft structure.

BACKGROUND AND PRIOR ART

Cable holders for attaching cables to an underlying structure are well known in the art and have a variety of different constructions.

DE-GM 1896156, DE-PS 675892 and DE 9317299U1 disclose cable holders of one piece construction having a plurality of slots disposed parallel to one another in one portion of the holder for attaching cables to the holder.

EP0718946A1 discloses a cable holder in the form of a plate having holes disposed with uniform spacing over its entire surface.

The known cable holder constructions have a number of disadvantages as regards their ease of use particularly in their adaptability to the available space on the structure to which the cables are to be attached.

SUMMARY OF THE INVENTION

An object of the invention is to provide a cable holder which is simple in use and readily adaptable to the available space on the structure to which the holder is to be attached.

In accordance with the invention, the cable holder comprises a one-piece plate body which is elongated in a longitudinal direction and which has first and second portions extending side by side in the longitudinal direction of the plate, the first portion being provided with a row of transverse slots extending in uniformly spaced parallel relation in the longitudinal direction of the plate. The plate is made of polyether ether ketone.

The slots have a length of 10 to 18 mm and a width of 4 to 6 mm. The slots are spaced from one another by 7 to 12 mm. The plate has longitudinal edges and at least one of the edges is provided with indicator markings uniformly spaced in the longitudinal direction of the plate to enable the plate to be severed at the indicator markings to obtain plate segments of determined length. In this way, segments of determined length can be obtained to adapt to the available space on the structure to which the holder is to be attached.

An advantage of the cable holder of the invention is that it can be simply adapted to a predetermined length and attached simply to the appropriate support surface of the vehicle structure. Furthermore, a high density of cable attachment can be achieved due to the adaptability of the size of the plate segments to the available space on the vehicle structure. The cables are attached to the plate segments by means of cable connectors such as conventional straps which are engaged in the slots of the plate segment. The material of the plate is strong, relatively lightweight, and inexpensive in its manufacture.

In accordance with a feature of the invention, the slots are provided in one portion of the plate and the other portion of the plate is free of slots. The slotted portion of the plate can be at a different level from the unslotted portion and connected thereto by a step. The unslotted portion can be provided with holes for attaching the plate to the vehicle structure. Alternatively, the plate can be secured to the vehicle structure by an adhesive, preferably a two-part polyurethane elastomer applied to the unslotted portion.

In accordance with a further feature of the invention the indicator markings can be in the form of notches to guide the severance of the plate segments into determined lengths.

DETAILED DESCRIPTION

Figure 1:
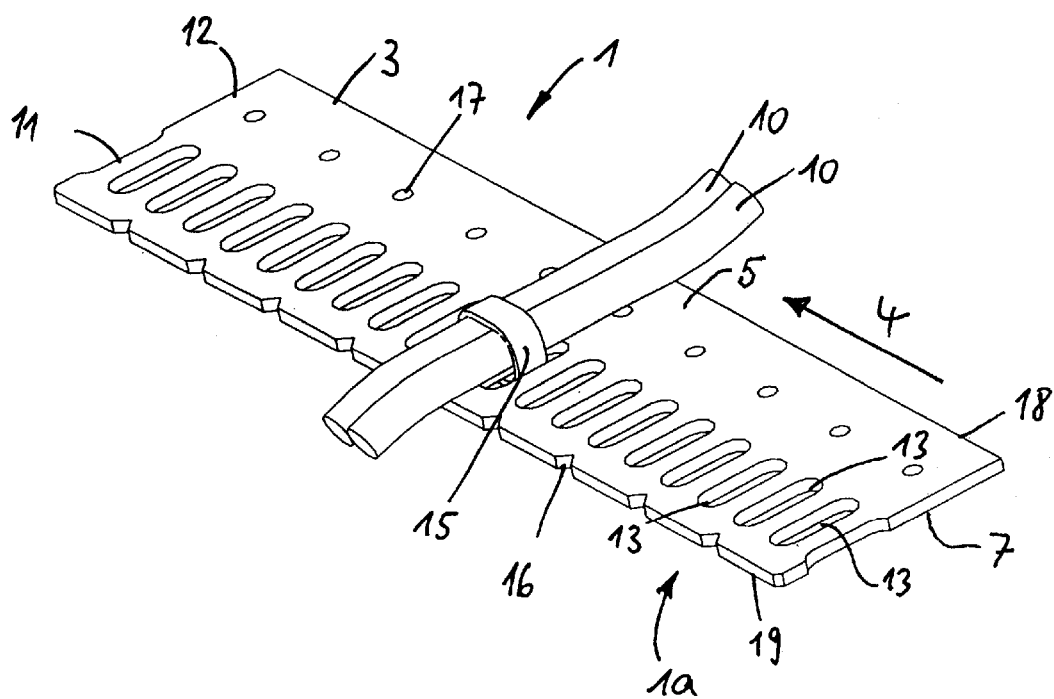
FIG. 1 is a perspective view diagrammatically illustrating one embodiment of the cable holder according to the invention.
Figure 2:
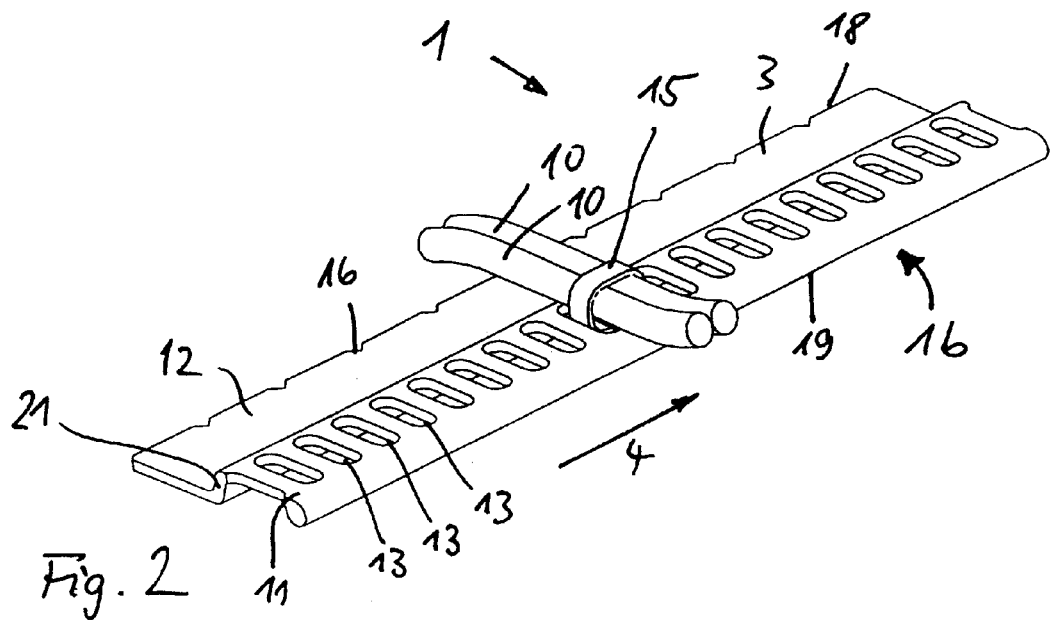
FIG. 2 is a perspective view of another embodiment of the cable holder of the invention.
Figure 3:
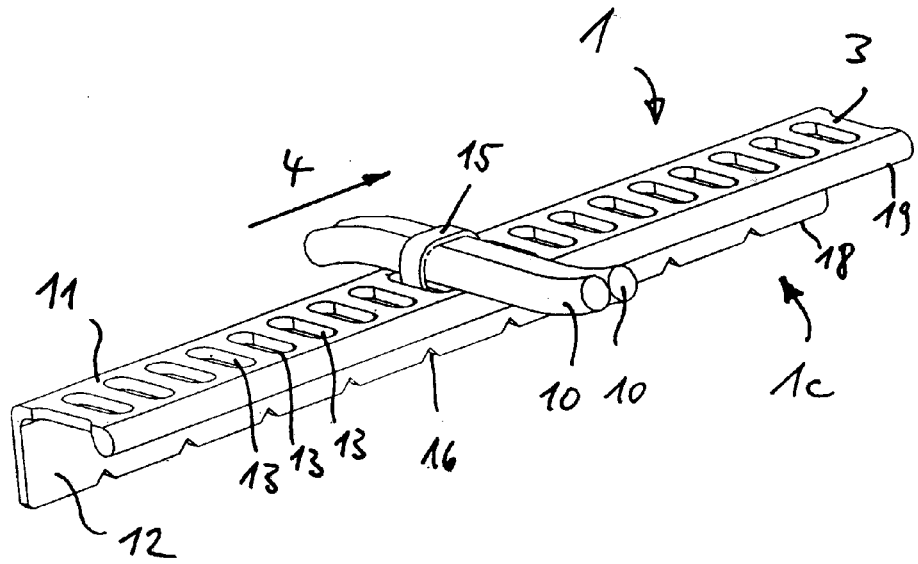
FIG. 3 is a perspective view of a third embodiment of the cable holder of the invention.

The drawings show a cable holder 1 in the form of a plate 3 elongated in a longitudinal direction 4. The plate 3 may be planar as shown in FIG. 1. or of Z shape as shown in FIG. 2 or of an angle shape as shown in FIG. 3. The same reference numerals are used in FIGS. 1–3 to designate the same elements.

The plate 3 has an upper surface 5 and a lower surface 7. A plurality of cables 10 are adapted to be attached to the upper surface of the plate 3 by means of conventional cable connectors 15, such as straps, which are well known in the art. The plate 3 is divided into first portion 11 for fastening the cables 10 and a second portion 12 which can be used for attaching the plate to the surface of the vehicle structure. The first and second portions 11 and 12 extend in the longitudinal direction 4 of the plate in side by side relation along the entire length of the plate. The holder 1 can be planar as indicated at 1a in which case the first and second portions lie in a common plate while in FIG. 2 the plate has a stepped configuration as shown at 1b in which case the first and second portions are disposed in different planes and provide a Z shape for the holder. In FIG. 3 the plate has an angled section in which the first and second portions are at right angles to one another and form an angle section 1c.

The first portion 11 is provided with a row of transverse slots 13 extending in uniformly spaced parallel relation in the longitudinal direction of the plate. The slots are self-contained and confined within the outline of the first portion 11.

The slots 13 provide passages for the cable connectors 15 to attach the cables 10 to the cable holder 1. The portion 12 which is unslotted can be provided with a plurality of holes 17 uniformly spaced in the longitudinal direction of the plate in order to fasten the cable holder to the vehicle structure by suitable fasteners, such as bolts or screws. Alternatively, the cable holder can be adhesively secured to the vehicle structure by an adhesive which is applied to the lower surface of the unslotted portion of the cable holder. The adhesive can be a two-part polyurethane elastomer.

The width of both the first and second portions 11 and 12 is between 20 and 25 mm, and the total width of the cable holder 1 is between 42 and 48 mm, and preferably is 45 mm.

A plurality of indicator markings 16 are provided in uniformly spaced relation in the longitudinal direction 4 along one or both longitudinal edges of the plate 3. The indicator markings serve as locations to enable the plate 3 to be severed at the markings to obtain plate segments of determined length. The indicator markings are formed as notches to guide the cutting tool for separating the plate segments from the plate.

The slots 13 are each 10 to 18 mm in length, preferably 15 mm and between 4 and 6 mm in width and preferably is 5 mm. The longitudinal spacing between the slots is between 7 and 12 mm, and preferably is about 7 mm.

In the embodiment of FIG. 2, as previously explained, the cable holder is not in the form of a plane plate, but in the form of a Z shaped plate 1b. The first and second longitudinal portions of the holder are separated by a step 21 in order to be at separate levels and the step extends in the longitudinal direction 4. The height of the step is a function of the particular application. The indicator markings 16 are provided along the longitudinal edge 18 of longitudinal portion 12. The slots 13 have the same shape and dimension as described above with reference to FIG. 1.

Referring to FIG. 3, herein the cable holder is constructed as an angle retainer 1c as previously indicated. The first portion 11 containing the slots 13 is disposed at an angle relative to the second portion 12. Preferably, the angle is 90°, but it depends on the particular application. The indicated markings 16 are provided along the longitudinal edge 19 of the second portion 12. The size and disposition of the slots in the first portion are the same as those described above with reference to FIG. 1. The width of the first and second portions 11 and 12 in the holder 1c are the same as in the embodiments of FIGS. 1 and 2.

The cable holder is made of polyether ether ketone which can contain up to 10 to 30 percent by weight of glass fibers, preferably 30% by weight. This material has the advantage that the holder can be easily manufactured and provides adequate strength for use in automotive applications and particularly in aircraft applications. The material is also highly resistant to a wide variety of aggressive fluids present in such applications.

The holes 17 which have been shown in FIG. 1 and also could be present in the embodiments of FIGS. 2 and 3 are provided in the second portion 12 at uniform spacing of between 10 and 30 mm and preferably 18 mm. In general, the spacing of the holes 17 depends on the support surface of the vehicle structure to which the holder is to be attached. As previously indicated, the cable holder can be adhesively attached to the support surface of the vehicle structure.

In use, the cable holder is attached to the support structure and when the available space is less than the length of the cable holder it can be divided at the indicator markings to obtain a holder segment which will fit the available space on the surface of the support structure. The separation of the segments can be achieved by cutting or sawing the plate at the indicator markings.

Although the invention has been described in relation to specific embodiments thereof, it will become apparent to those skilled in the art that numerous modifications and variations can be made without departing from the scope and spirit of the invention as defined in the attached claims.

What is claimed is:

1. A cable holder for attaching connectors of cables to a vehicle structure, said cable holder comprising a plate elongated in a longitudinal direction, said plate having first and second portions extending side-by-side in the longitudinal direction of the plate, said first portion of said plate being provided with a row of transverse slots confined and self-contained within said first portion and extending in uniformly spaced, parallel relation in the longitudinal direction of the plate for attachment of cable connectors thereto, said second portion being unslotted, said plate being a one-piece body made of polyether ether ketone, said slots having a length of 10 to 18 mm and a width of 4 to 6 mm, said slots being spaced from one another by 7 to 12 mm, said plate having longitudinal edges at least one of which is provided with indicator markings uniformly spaced in the longitudinal direction of the plate, said indicator markings being in the form of notches to enable the plate to be severed at said markings to obtain plate segments of determined length, and an adhesive on a lower surface of at least said second portion of said plate for attachment to the vehicle structure, said adhesive comprising a two component polyurethane elastomer.

2. The cable holder of claim 1, wherein said plate includes up to 10 to 30% by weight of glass fibers.

3. The cable holder of claim 1, wherein said plate has a width of 42 to 48 mm and said first portion of the plate has a width of 20 to 25 mm.

4. The cable holder of claim 1, comprising a step between said first and second portions, said indicator markings being provided on the longitudinal edge of the plate extending along said second portion.

5. The cable holder of claim 1, wherein said first portion of the plate is disposed at an angle relative to said second portion.

6. The cable holder of claim 1, wherein said second portion is provided with a plurality of holes uniformly spaced in the longitudinal direction of the plate for attaching the plate to the vehicle structure.

7. The cable holder of claim 1, wherein said indicator markings are provided on both longitudinal edges of said plate.

* * * * *